United States Patent
Crandall

[11] Patent Number: 5,853,203
[45] Date of Patent: Dec. 29, 1998

[54] BARBED TUBULAR CONNECTORS

[75] Inventor: Robert M. Crandall, Capac, Mich.

[73] Assignee: Epic Technical Group, Inc., Auburn Hills, Mich.

[21] Appl. No.: 614,600

[22] Filed: Mar. 13, 1996

[51] Int. Cl.$^6$ ........................................... F16L 33/00
[52] U.S. Cl. .................. 285/259; 285/382.7; 138/109; 138/155; 29/515
[58] Field of Search ........................ 285/259, 242, 285/243, 245, 246, 247, 248, 249, 382, 382.7, 239; 138/109, 155, 177, DIG. 11; 29/515, 516

[56] References Cited

U.S. PATENT DOCUMENTS

| | | |
|---|---|---|
| 585,014 | 6/1897 | Wenzel et al. . |
| 1,166,059 | 12/1915 | Ledbetter . |
| 1,725,975 | 8/1929 | Bystricky . |
| 1,781,222 | 11/1930 | Fischer . |
| 1,994,784 | 3/1935 | Porzel ........................................ 285/76 |
| 2,209,181 | 7/1940 | Wendel ...................................... 29/88.2 |
| 2,264,815 | 12/1941 | Thomson .................................... 285/80 |
| 2,805,088 | 9/1957 | Cline et al. .............................. 285/239 |
| 2,873,985 | 2/1959 | Baldwin, Jr. ...................... 285/382.7 X |
| 3,711,130 | 1/1973 | Betzler .................................... 285/239 |
| 3,767,233 | 10/1973 | Hodge ...................................... 285/239 |
| 3,830,531 | 8/1974 | Burge ...................................... 285/239 |
| 3,948,546 | 4/1976 | Welsby et al. ........................... 285/239 |
| 3,966,238 | 6/1976 | Washkewicz et al. ................... 285/239 |
| 4,018,462 | 4/1977 | Saka ....................................... 29/516 X |
| 4,603,890 | 8/1986 | Huppee ................................... 285/239 |
| 4,626,005 | 12/1986 | Stifter .................................... 285/137.1 |
| 4,712,809 | 12/1987 | Legris ....................................... 285/21 |
| 4,798,569 | 1/1989 | Alderfer .................................. 474/255 |
| 5,017,182 | 5/1991 | Mabie ..................................... 474/256 |
| 5,160,176 | 11/1992 | Gale ........................................ 285/165 |
| 5,261,709 | 11/1993 | McNaughton et al. ................. 285/319 |
| 5,351,998 | 10/1994 | Behrens et al. ...................... 285/382.7 |

FOREIGN PATENT DOCUMENTS

| | | | |
|---|---|---|---|
| 168493 | 9/1959 | Sweden ................................ 285/242 |

*Primary Examiner*—Heather Shackelford
*Attorney, Agent, or Firm*—Pennie & Edmonds LLP

[57] ABSTRACT

The present invention relates to a connector for joining flexible tubular members. The connector has a cylindrical body having an outer diameter and at least one circumferential recess. At least one barb member is positioned and retained at least partially in the recess. The barb member has first and second ends with at least one of the ends having a diameter which extends beyond the outer diameter of the tubular body. The first end has a diameter which is greater than that of the second end and a rigid edge for engaging a flexible tubular member. The barb member provided with the connector can resist pull-off of the tubular member from the connector. The present invention also relates to a method for forming such a connector.

18 Claims, 3 Drawing Sheets

FIG. 4a
FIG. 4b
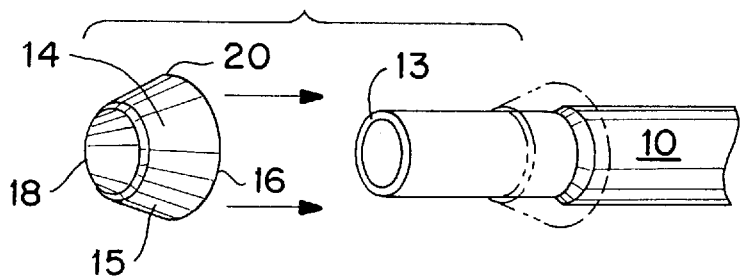
FIG. 4c
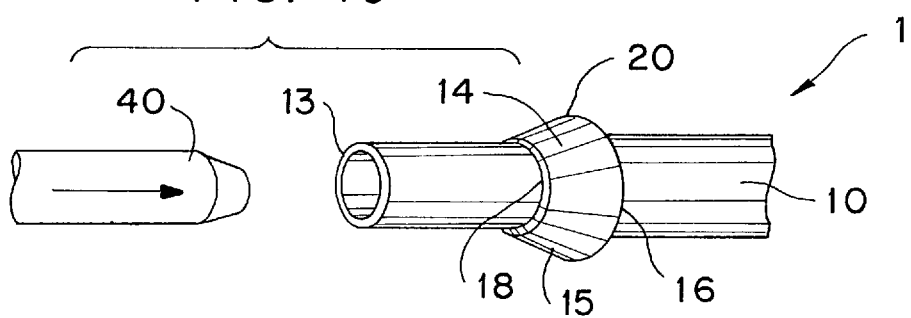
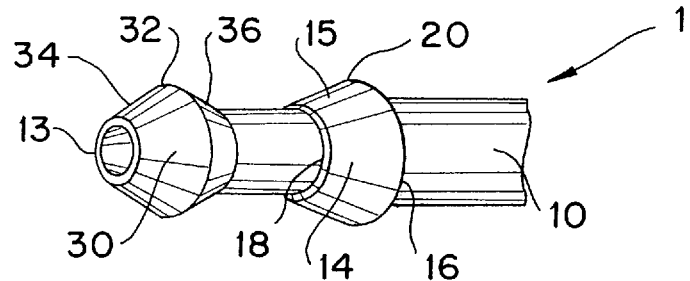
FIG. 4d

BARBED TUBULAR CONNECTORS

FIELD OF THE INVENTION

The present invention relates to a connector for joining flexible tubular members, and particularly a rigid tubular connector having independent barb members for engaging the inner circumference of a flexible tubular member to retain such tubular member on the connector. The present invention also relates to a method for forming such a tubular connector.

BACKGROUND OF THE INVENTION

Tubular connectors can be used in all types of industries for joining flexible tubing, hose, and similar cylindrical members to each other. A typical tubular connector comprises a rigid tubular body adapted to fit in the inner circumference of a free end of the flexible tubing. Such a tubular connector often adopts barb members integrated on its outer circumference. These barb members are force fit into the flexible tubing and have sharp edges to assist in retaining the flexible tubing on the tubular connector. This construction provides enhanced pull-off resistance of the flexible tubing from the connector. U.S. Pat. No. 4,712,809 to Legris, U.S. Pat. No. 4,626,005 to Stifter, U.S. Pat. No. 4,603,890 to Huppee, U.S. Pat. No. 3,966,238 to Washkewicz et al., U.S. Pat. No. 3,948,546 to Welsby et al., U.S. Pat. No. 3,767,233 to Hodge, U.S. Pat. No. 3,711,130 to Betzler, U.S. Pat. No. 2,805,088 to Cline et al., U.S. Pat. No. 1,994,784 to Porzel, and U.S. Pat. No. 1,166,059 to Ledbetter all disclose these or similar tubular connectors.

Conventional tubular connectors are usually formed with integral barb members and tubular bodies. As an example, some tubular connectors can be made by machining down a large size tubular body to form barb members with sharp edges thereon. Other tubular connectors can be molded with barb members integrated on tubular bodies of the connectors. Such barb members are usually made of the same material as that of tubular bodies even though barb members must withstand pull-off forces during use. In addition, the sharp edges of the barb members are difficult, if not impossible, to form in a tubular connector without causing stress raisers which can lead to stress failure. The formed barb members usually remain under stress and often, after a period of time, break in an unacceptable and hazardous manner.

Therefore, it is desirable to provide a novel tubular connector that has less stress in its construction and provides better overall mechanical strength. The present invention provides such a tubular connector to meet the requirements.

SUMMARY OF THE INVENTION

The present invention relates to a connector for joining flexible tubular members. The connector comprises a cylindrical body having an outer diameter and at least one circumferential recess. At least one barb member is positioned and retained at least partially in the recess. The barb member comprises first and second ends with at least one of the ends having a diameter which extends beyond the outer diameter of the tubular body. The first end has a diameter which is greater than that of the second end and a rigid edge for engaging a flexible tubular member. The barb member provided with the connector can resist pull-off of the tubular member from the connector.

According to the connector of the present invention, the outer surface of the barb member uniformly decreases in diameter from the rigid edge to the second end. The cylindrical body is a tubular body and the barb member is made of a material which is more rigid than that of the tubular body.

In a preferred embodiment, the tubular body of the connector includes an end member. A portion of the end member has a greater diameter than that of the tubular body to assist in retaining the tubular member in engagement with the connector. The end member has a first tapered surface extending from an end of the connector to the greater diameter portion and a second tapered surface extending from the greater diameter portion toward the barb member.

The connector of the present invention can have one end of the tubular body integrally formed on an end of a second tubular member, and therefore connects the first tubular member to the second tubular member.

Alternatively, the connector of the present invention comprises a cylindrical body having an outer diameter and at least two circumferential recesses. At least one independent barb member is positioned and retained at least partially in each recess. Each barb member comprises first and second ends with at least one of the ends having a diameter which extends beyond the outer diameter of the tubular body. Each first end has a diameter which is greater than that of the corresponding second end and a rigid edge for engaging a flexible tubular member.

In the alternative embodiment, the cylindrical body is preferably a tubular body. The tubular body is provided with at least one end member. A portion of the end member has a greater diameter than that of the tubular body to assist in retaining the tubular member in engagement with the connector. The connector has a symmetric structure.

The present invention further relates to a method for forming a connector. The method comprises the steps of: providing a cylindrical body having an outer diameter and a free end, and providing onto the reduced diameter end of the cylindrical body at least one barb member adapted to be loosely fit thereon. The barb member comprises first and second ends with at least one of the ends having a diameter which extends beyond the outer diameter of the cylindrical body. The first end has a diameter which is greater than that of the second end and a rigid edge for engaging a flexible tubular member. The method of the present invention also comprises retaining the barb member in position on the cylindrical body, thus forming a connector for engaging a flexible tubular member whereby the barb member resists pull-off of the tubular member from the connector.

Preferably, the cylindrical body of the connector is a tubular body. The retaining step in the method of the present invention comprises reducing the diameter of the cylindrical body at its free end prior to the step of providing the barb member onto the reduced end of the tubular body, and increasing the diameter of the reduced diameter end of the tubular body after the step of providing the barb member onto the reduced end of the tubular body. Alternatively, the retaining step in the method of the present invention comprises swaging down the diameter of the second end of the barb member.

The method of the present invention further comprises the step of forming an end member at the free end of the tubular body. A portion of the end member has a greater diameter than that of the tubular body.

According to the method of the present invention, the barb member is molded or machined to the desired dimensions prior to the step of providing the barb member onto the reduced end of the tubular body.

In another embodiment of the present invention, the method comprises repeating the recited steps on the opposite end of the tubular body for engagement of another flexible tubular member.

The present invention further relates to a connector formed by the method of the present invention.

BRIEF DESCRIPTION OF THE DRAWINGS

These and other features, aspects, and advantages of the present invention will become much more apparent from the following description, appended claims, and accompanying drawings, in which:

FIGS. 4a to 4d illustrate the formation of the connector shown in FIG. 1.

DETAILED DESCRIPTION OF THE PREFERRED EMBODIMENTS

Figure 1:
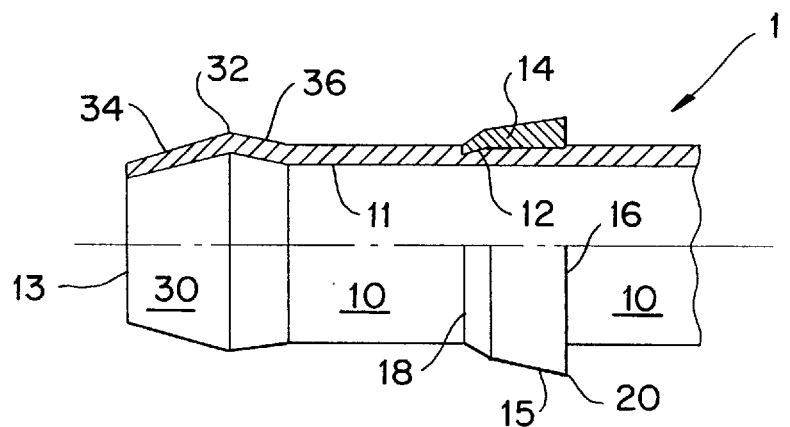
FIG. 1 is a longitudinal partial section view of a connector according to the present invention.

A barbed tubular connector 1 embodying principles of the present invention is illustrated in FIGS. 1–4. Referring to FIG. 1, the connector 1 comprises a cylindrical body, preferably a tubular body 10. Although the tubular body 10 is typically made of metal, other materials such as various plastics could also be used. The tubular body 10 preferably has an inner circumference 11 with a uniform diameter. At least one circumferential recess 12 is formed on the tubular body 10. The connector 1 further comprises at least one independently formed barb member 14 positioned and retained at least partially in the recess 12. The connector 1 of the present invention has less stress in its construction and better overall mechanical strength.

The independent barb member 14 has first and second ends 16 and 18. At least one of the ends 16 and 18 extends beyond the diameter of the tubular body 10. At the first end 16, a rigid, sharp edge 20 is formed for engaging the inner circumference 22 of a flexible tubular member 24 (FIG. 2), and therefore retains the tubular member 24 on the connector 1. In a preferred embodiment, the barb member 14 is in the shape of a frustum. The first end 16 has a greater diameter than that of the second end 18. The outer surface 15 of the barb member 14 uniformly decreases in diameter from the first end 16 to the second end 18.

The barb member 14 is preferably formed from various metals, such as brass, stainless steel, aluminum and coated steel. Depending upon the material of the tubular member 24, the barb member 14 may be made of nylon or other rigid plastics. The barb member 14 is made of a material which is more rigid than that of the tubular body 10 as well as the flexible tubular member 24 so that it will securely engage and secure the flexible tubular member 14 to the tubular body 10. Such design helps remedy the structural weakness of the sharp edge 20 formed on the barb member 14, and therefore the resultant barb member 14 can provide more pull-off resistance. The barb member 14 is independently formed prior to being fitted onto the tubular body 10. Various conventional methods can be employed to prepare the barb member 14 as discussed hereinafter.

The connector 1 further comprises an end member 30 spaced apart from the barb member 14 and formed at a free end 13 of the connector 1. Such end member 30 is prepared to be free of burrs and sharp edges. The end member 30 has a ridge 32, which has a greater diameter than that of the tubular body 10 of the connector 1. When included, the ridge 32 assists in retaining the tubular member 24 on the connector 1. Taper surfaces 34 and 36 extend oppositely from the ridge 32 toward the free end 13 of the connector 1 and the barb member 14 respectively. The free end 13 of the connector 1 is thus reduced in diameter. In a preferred embodiment, the free end 13 of the connector 1 has a smaller diameter than the inner diameter of the elastic tubular member 24. The smaller diameter of the free end 13 and the taper surface 34 on the connector 1 facilitate the insertion of the connector 1 into the tubular member 24.

Figure 2:
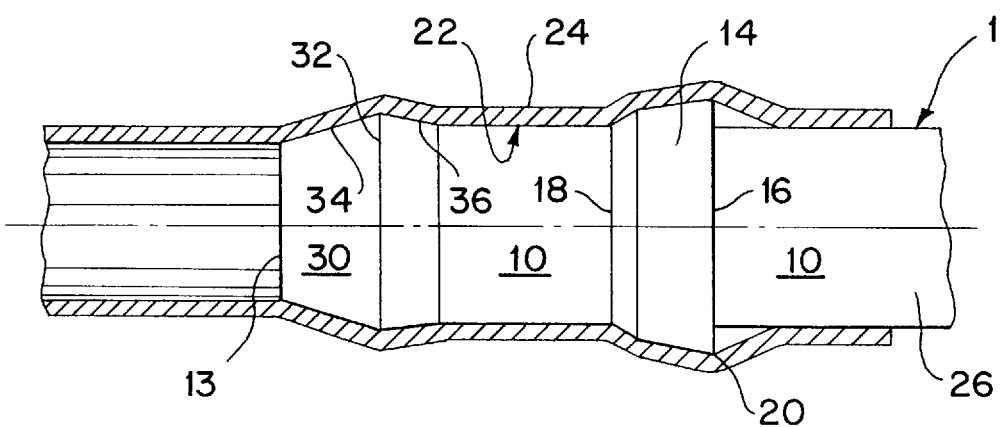
FIG. 2 is a longitudinal partial section view of the connector shown in FIG. 1 when in use.

Referring to FIG. 2, the connector 1 is force fit within the inner circumference 22 of the flexible tubular member 24. The tubular member 24 can be made of various flexible or elastic materials, such as elastomers and plastics, with fluoropolymers in particular being preferred. Preferably, the tubular member 24 has a smaller inner diameter than the diameter of the tubular body 10. When the connector 1 is being inserted into the inner circumference 22 of the tubular member 24, the tubular member 24 is slightly stretched or expanded to receive the connector 1. After the connector 1 is fully inserted inside the tubular member 24, the stretched tubular member 24 has a tendency to return to its original shape due to its elasticity. Therefore, the elastic tubular member 24 can securely and completely surround the connector 1 to connect with the same.

In the preferred embodiment of the present invention, the tubular body 10 of the connector 1 directly communicates with the inner circumference 22 of the tubular member 24. Therefore, the connection between the connector 1 and the tubular member 24 can be used in fluid conduit. Such connection is a fluid-tight reliable pressure seal of the tubular member 24 to the connector 1 and withstands normal operating pressures without becoming disengaged.

In addition, the portion of the tubular member 24 fitted over the barb member 14 of the connector 1 is further stretched and surrounds the sharp edge 20 more tightly. The sharp edge 20 on the barb member 14 also acts as a barrier for the tubular member 24 to pass over, and therefore prevents the tubular member 24 from being pulled off from the connector 1. In a preferred embodiment when the barb member 14 is made of a material more rigid than that of the tubular body 10, the barb member 14 can withstand even greater pull-off force. Therefore, the connector 1 according to the present invention with the independent barb member 14 can more effectively retain the tubular member 24 on the connector 1.

The connector 1 can be manually inserted in a free end portion of tubular member 24. For an easy insertion, the connector 1 can be screwed onto the tubular member 24 instead of being pushed in. The tubular member 24 can also be removed from the connector 1 manually or with aid of simple tools. The assembly and disassembly of the connector 1 with the tubular member 24 can be completed by conventional methods.

The connection between the connector 1 and tubular member 24 eliminates the need for special tools for assembly, ensures a more rapid connection of the connector 1 with the tubular member 24, makes it possible for easy replacement of the tubular member 24 if a leak develops therein and has a high pull strength because of the sharp edge 20 of the barb member 14.

In addition, the connection of the connector 1 of the present invention and the tubular member 24 is reinforced to resist the tubular member 24 from being pulled-off from the connector 1. According to the present invention, the independent preparation of the barb member 14 can eliminate stress failure occurred in the integral formation of a conventional connector and result in a construction having much less stress remained in the barb member 14. Further, the design choice of using a more rigid material for forming the barb member 14 compensates the structural weakness of a sharp edge in a conventional barb member. Therefore, the connector 1 of the present invention has a better overall mechanical strength to withstand high pull-off forces.

In a preferred embodiment, the connector 1 has its opposite end integrated with one end of a second elongated tubular member 26. In other words, the connector 1 is integrally formed at the end of a second tubular member 26. As a result of such embodiment, the tubular member 24 is effectively connected with the second elongated tubular member 26 through the connector 1.

Figure 3:
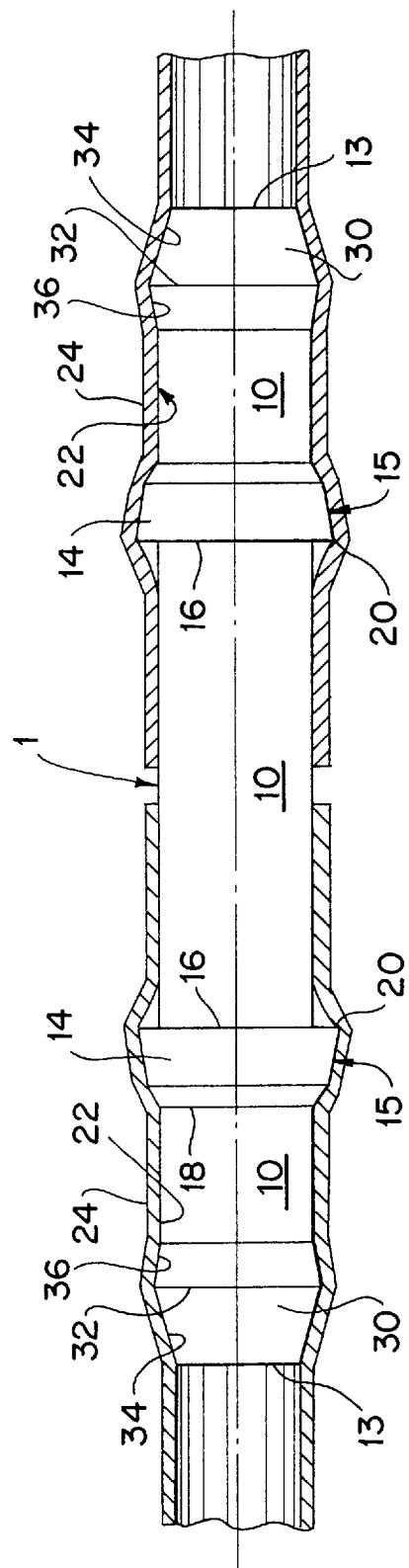
FIG. 3 is a longitudinal partial section view of a connector of an alternative embodiment when in use.

Referring to FIG. 3, a modified connector 1 of the present invention is shown connecting two tubular members 24. The connector 1 comprises a cylindrical body, preferably a tubular body 10 having at least two circumferential recesses 12 (see FIG. 1) near its ends 13. At least two independent barb members 14 are positioned and retained at least partially in the recesses 12. The connector 1 can also have at least one end member 30 formed at least one of its ends 13. The barb members 14 and the end member 30 have similar structures to the corresponding ones as discussed hereinabove. It is understandable to one of ordinary skill in the art that the barb members 14 are oppositely oriented for retaining one tubular member 24 on each opposite end 13 of the connector 1.

In a preferred embodiment as shown in FIG. 3, the connector 1 has a symmetric structure. Each end 13 of the connector 1 has an end member 30 and same number of barb members 14, such as one barb member 14 in this preferred embodiment, spaced from each other. The barb members 14 and end members 30 have the same dimension, respectively and are oppositely oriented at opposite ends 13 of the connector 1. The connector 1 of this type eliminates identification of one end from the other, and therefore is more convenient in use.

Referring to FIGS. 4a–4d, the formation of a connector 1 of the present invention is illustrated. The method for forming the connector 1 according to the present invention comprises the step of providing a cylindrical body, preferably a tubular body 10 having a free end 13. As noted above, the tubular body 10 can be made of various materials, and is preferably made of a metal such as aluminum. The inner circumference of the tubular body 10 has preferably a uniform diameter, so that no fluid turbulence will occur inside the connector 1 when in use.

In a preferred embodiment as shown in FIG. 4a, the free end 13 of the tubular body 10 is then reduced in diameter by conventional means, such as swaging, rolling, compression forming and the like.

At least one barb member 14 is formed independently from the tubular body 10 by various conventional methods, such as molding and machining. As noted above, the barb member 14 is preferably made of a rigid metal or plastic material. The barb member 14 is formed with a bore adapted to fit onto the reduced free end 13 of the tubular body 10. The barb member 14 is then provided onto the reduced end of the tubular body 10 and is loosely fit thereon. FIG. 4b shows this combination.

After the barb member 14 is drawn onto the reduced end of the tubular body 10, it is then retained in position thereon.

To facilitate such retaining, the diameter of the reduced end 13 of the tubular body 10 is enlarged or restored to its initial dimension. Such restoration can be performed by various conventional methods. In the preferred embodiment as shown in FIG. 4c, a spindle 40 is used to increase the diameter of the reduced end 13 on the tubular body 10 by being forced into the inner circumference of the reduced end 13 on the tubular body 10. The diameter of the reduced end 13 on the tubular body 10 is preferably increased to the same dimension of the diameter of the second end 18 of the barb member 14. Therefore, the formed connector 1 can avoid shoulders or snags at the second end 18 of the barb member 14 that prevent the connector 1 from being inserted into the tubular member 24.

In addition, the diameter of the spindle 40 is preferably the same as that of the inner circumference of the tubular body 10 before size reduction. Therefore, the restored tubular body 10 has a uniform inner diameter avoiding any possible fluid turbulence when the formed connector 1 is in use.

In an alternative embodiment of the method for forming the connector 1 of the present invention, a similar independent barb member 14 is pulled onto the free end 13 of the tubular body 10 of the connector 1. The second end 18 of the barb member 14 is then swaged down to retain the barb member 14 in position on the tubular body 10. Preferably, the second end 18 of the barb member 14 is swaged to be flush to the tubular body 10 of the connector 1. Therefore, as noted above, no shoulders or snags will result at the second end 18 of the barb member 14 that prevent the connector 1 from being inserted into the tubular member 24.

In the alternative embodiment, the circumferential recess 12 (see FIG. 1) is formed when the second end 18 of the barb member 14 is swaged down to retain the barb member 14 on the tubular body 10. The retaining is facilitated by swaging down the second end 18 of the barb member 14 after being provided onto the tubular body 10. The diameter of the free end 13 on the tubular body 10 needs not to be changed as in the previous embodiment. Therefore, the method of the alternative embodiment is easier to be carried out.

Although not preferred, an additional retaining member can be placed on the reduced end of the tubular body 10 to retain the barb member 14 in the desired position. Also, the barb member 14 can be bonded to the tubular body 10 by an adhesive, welding or other joining method so that it is retained in the proper position.

In addition, an end member 30 can be formed, through various conventional methods, at the free end 13 of the tubular body 10. The end member 30 can have the same structure and facilitate insertion of the connector 1 into the tubular member 24 as discussed hereinabove. FIG. 4d shows a connector 1 with such end member 30 formed at its free end 13.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A connector for joining flexible tubular members comprising:

a tubular body having an outer diameter, a free end, an end member, and at least one circumferential recess, wherein a portion of the end member has a greater diameter than that of the tubular body and a first tapered surface extending from the free end of the connector to the greater diameter portion of the end member to assist in engaging a flexible tubular member and for retaining the flexible tubular member in engagement with the connector; and at least one barb member positioned and retained at least partially in the recess, the barb member comprising first and second ends with the second end positioned in the recess and having an outer diameter which is substantially the same as the outer diameter of the tubular body to provide a relatively smooth transition therebetween, and with the first end having an outer diameter which is greater than that of the second end and a rigid edge for engaging the flexible tubular member and for resisting pull-off of the tubular member from the connector.

2. The connector of claim 1, wherein the end member has a second tapered surface extending from the greater diameter portion toward the barb member.

3. The connector of claim 2, wherein one end of the tubular body is integrally formed on an end of a second tubular member.

4. A method for forming a connector comprising the steps of:

providing a cylindrical body having an outer diameter and a free end;

providing onto the cylindrical body at least one barb member adapted to be loosely fit thereon, said barb member comprising first and second ends with the second end having an outer diameter which is substantially the same as the outer diameter of the cylindrical body to provide a relatively smooth transition therebetween, and with the first end having an outer diameter which is greater than that of the second end and a rigid edge for engaging a flexible tubular member;

fixing the barb member in position on the cylindrical body spaced from the first free end thereof with the first end of the barb member facing away from the first free end of the cylindrical body and the second end of the barb member facing the first free end of the cylindrical body; and forming an end member between the first free end of the tubular body and the barb member, wherein a portion of the end member has a greater outer diameter than that of the tubular body, thus forming a connector for engaging the flexible tubular member, whereby the rigid edge of the barb member resists pull-off of the flexible tubular member from the connector.

5. The method of claim 4 wherein said cylindrical body is a tubular body, and said fixing step comprises:

reducing the outer diameter of the tubular body at the first free end prior to the step of providing the barb member onto the reduced outer diameter first free end of the tubular body; and increasing the reduced outer diameter first free end of the tubular body after the step of providing the barb member onto the reduced outer diameter first free end of the tubular body.

6. The method of claim 5 further comprising the step of molding the barb member to desired dimensions prior to the step of providing the barb member onto the reduced outer diameter first free end of the tubular body.

7. The method of claim 5 wherein the tubular body has a second free end, and which further comprising repeating the recited steps on the second free end of the tubular body for providing a second barb member for engagement of the connector with another flexible tubular member.

8. The connector formed by the method of claim 7.

9. The method of claim 4 wherein said fixing step comprises swaging down at least the first end of the barb member.

10. The method of claim 4 further comprising the step of machining the barb member to desired dimensions prior to the step of providing the barb member onto the reduced outer diameter first free end of the tubular body.

11. The connector formed by the method of claim 4.

12. A connector for joining flexible tubular members comprising:

a body member having a first free end and a first end portion having an outer diameter;

a barb member spaced from the first free end of the body member and positioned and retained on the first end portion thereof, the barb member comprising a first end having an outer diameter which is substantially the same as the outer diameter of the body member first end portion, and a second end which has an outer diameter that is greater than that of the first end of the barb member, said second end including a rigid edge for engaging a flexible tubular member; and an end member positioned between the first free end of the body member and the barb member, with a portion of the end member having a greater outer diameter than that of the body member to assist in retaining the flexible tubular member in engagement with the connector, wherein the first end of the barb member faces the first free end of the body member and the second end of the barb member faces away from the first free end of the body member to provide a relatively smooth transition between the first end portion of the body member and the barb member to facilitate sliding insertion of the flexible tubular member onto the connector and over the barb member, with the rigid edge of the barb member to further assist in retaining the flexible tubular member in engagement with the connector.

13. The connector of claim 12 wherein the body member end portion further comprises a recess and the first end of the barb member is positioned and retained in the recess so that the outer diameter of the first end of the barb member is positioned to align with the outer diameter of the body member first end portion.

14. The connector of claim 12, wherein the barb member has an outer surface which uniformly decreases in diameter from the second end to the first end, the body member is a tubular body, and the barb member is made of a material which is more rigid than that of the body member.

15. The connector of claim 12, wherein the end member has tapered surfaces extending to and from the greater outer diameter to facilitate sliding insertion of the flexible tubular member onto the connector and over the end member.

16. The connector of claim 12, wherein said body member has a second free end, and a second end portion having an outer diameter; and further comprising:

an additional barb member spaced from the second free end of the body member and positioned and retained on the second end portion, the additional barb member comprising a first end having an outer diameter which is substantially the same as the outer diameter of the body member second end portion, and a second end which has a diameter that is greater than that of the first end of the additional barb member, said second end including a rigid edge for engaging another flexible tubular member;

wherein the second end of the additional barb member faces away from the second end of the body member to provide a relatively smooth transition between the second end portion of the body member and the second barb member to facilitate sliding insertion of the flexible tubular member onto the connector and over the additional barb member, with the rigid edge of the additional barb member retaining the flexible tubular member in engagement with the connector.

17. The connector of claim 16, which further comprises a second end member positioned between the second free end of the body member and the additional barb member, with a portion of the second end member having a greater outer diameter than that of the body member to assist in retaining the flexible tubular member in engagement with the connector.

18. The connector of claim 17, wherein the second end member has tapered surfaces extending to and from the greater outer diameter to facilitate sliding insertion of the flexible tubular member onto the connector and over the second end member.

* * * * *